US010747567B2

(12) United States Patent
Chakraborty et al.

(10) Patent No.: US 10,747,567 B2
(45) Date of Patent: Aug. 18, 2020

(54) CLUSTER CHECK SERVICES FOR COMPUTING CLUSTERS

(71) Applicant: Nutanix, Inc., San Jose, CA (US)

(72) Inventors: Anupam Chakraborty, Bangalore (IN); Renigunta Vinay Datta, Telangana (IN)

(73) Assignee: Nutanix, Inc., San Jose, CA (US)

( * ) Notice: Subject to any disclaimer, the term of this patent is extended or adjusted under 35 U.S.C. 154(b) by 232 days.

(21) Appl. No.: 15/954,147

(22) Filed: Apr. 16, 2018

(65) Prior Publication Data

US 2019/0317789 A1 Oct. 17, 2019

(51) Int. Cl.
*G06F 9/455* (2018.01)
*G06F 16/951* (2019.01)
*H04L 29/12* (2006.01)

(52) U.S. Cl.
CPC ........ *G06F 9/45558* (2013.01); *G06F 16/951* (2019.01); *H04L 61/1511* (2013.01); *H04L 61/2007* (2013.01); *G06F 2009/45579* (2013.01); *G06F 2009/45591* (2013.01); *G06F 2009/45595* (2013.01)

(58) Field of Classification Search
CPC .............. G06F 9/45558; G06F 16/951; G06F 2009/45579; G06F 2009/45591; G06F 2009/45595; H04L 61/1511; H04L 61/2007
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 10,009,443 | B1 * | 6/2018 | Guigli ................. H04L 47/783 |

OTHER PUBLICATIONS

Metro Availability Witness Option. [online] Retrieved From the Internet. (Year: 2017).*
Poitras. The Nutanix Bible. [online] pp. 1-490. Retrieved From the Internet <https://web.archive.org/web/20170202145706/http://nutanixbible.com/> (Year: 2017).*
Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Emerson C Puente
*Assistant Examiner* — Jonathan R Labud
(74) *Attorney, Agent, or Firm* — Dorsey & Whitney LLP

(57) ABSTRACT

Examples described herein may provide cluster check services which may determine whether at least one infrastructure dependent virtual machine (e.g., at least one domain controller and/or at least one DNS server) is located outside of a cluster. In this manner, the storage utilized by at least one of the infrastructure dependent virtual machines may not be part of the cluster itself, which may reduce and/or avoid failure and/or downtime caused by unavailability of the service(s) provided by the infrastructure dependent virtual machine.

21 Claims, 4 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, Ignacio et al. "Curator: Self-Managing Storage for Enterprise Clusters"; University of Washington; published Mar. 2017; pp. all.

* cited by examiner

CLUSTER CHECK SERVICES FOR COMPUTING CLUSTERS

TECHNICAL FIELD

Examples described herein relate to virtualized computing systems. Examples of cluster check services are described which may provide an alert when certain infrastructure dependent virtual machines are inaccessible outside a cluster.

BACKGROUND

A virtual machine (VM) generally refers to a software-based implementation of a machine in a virtualization environment, in which the hardware resources of a physical computer (e.g., CPU, memory, etc.) are virtualized or transformed into the underlying support for the fully functional virtual machine that can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine may not be utilized to perform useful work. This may be wasteful and inefficient if there are users on other physical machines which are currently waiting for computing resources. Virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

As virtualized systems grow in prevalence and complexity, it is increasingly difficult to ensure that the systems are properly configured, and to maintain a proper configuration, to avoid failure and downtime.

DETAILED DESCRIPTION

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Figure 1:
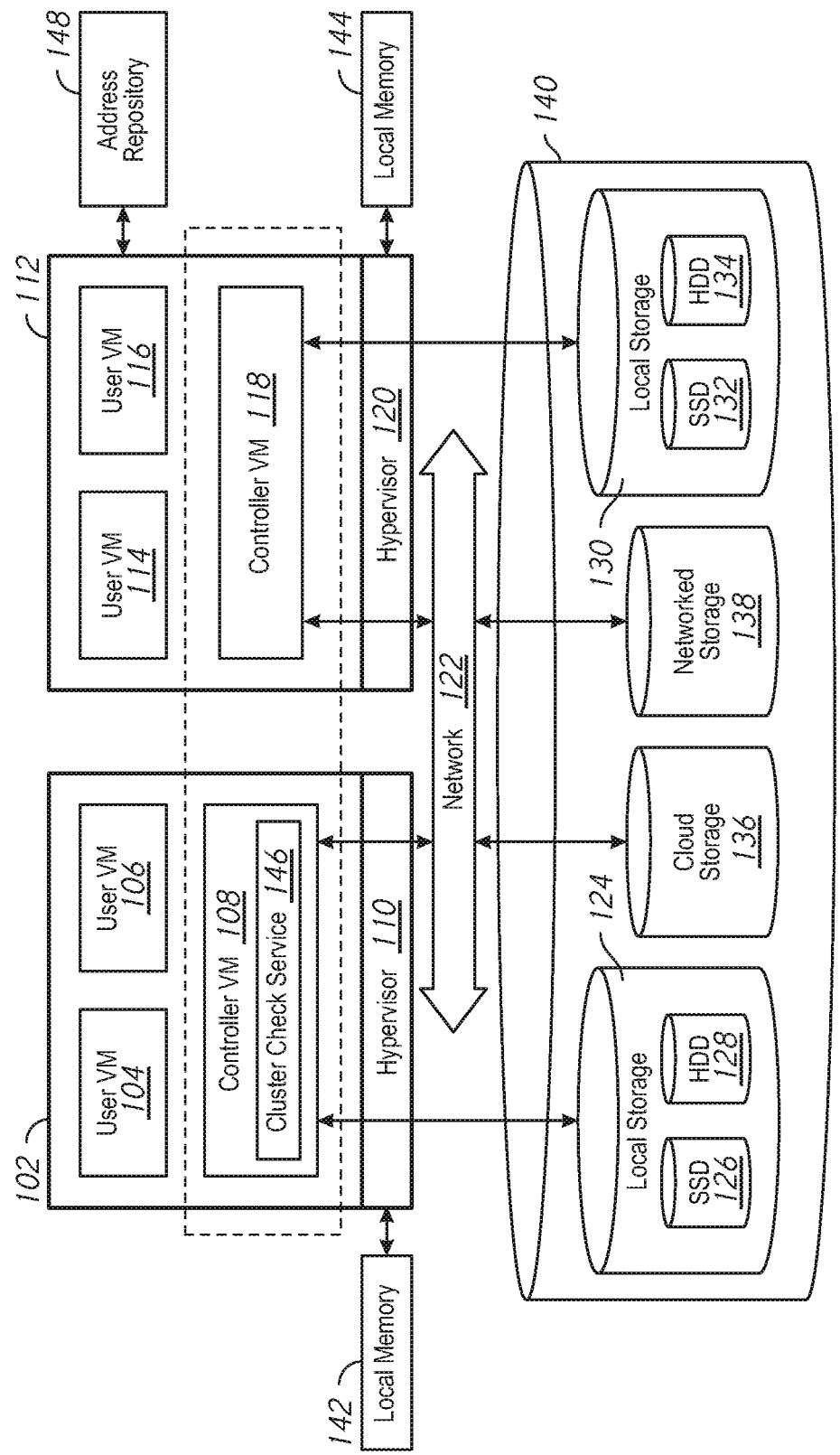
FIG. 1 is a block diagram of a distributed computing system, in accordance with embodiments described herein.

FIG. 1 is a block diagram of a distributed computing system, in accordance with embodiments described herein. The distributed computing system (e.g. virtualized system) of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128). Similarly, local storage 130 may include SSD 132 and HDD 134. Local storage 124 and local storage 130 may be directly coupled to, included in, and/or accessible by a respective computing node 102 and/or computing node 112 without communicating via the network 122. Other nodes, however, may access the local storage 124 and/or the local storage 130 using the network 122. Cloud storage 136 may include one or more storage servers that may be stored remotely to the computing node 102 and/or computing node 112 and accessed via the network 122. The cloud storage 136 may generally include any type of storage device, such as HDDs SSDs, or optical drives. Networked storage 138 may include one or more storage devices coupled to and accessed via the network 122. The networked storage 138 may generally include any type of storage device, such as HDDs SSDs, and/or NVM Express (NVMe). In various embodiments, the networked storage 138 may be a storage area network (SAN). The computing node 102 is a computing device for hosting virtual machines (VMs) in the distributed computing system of FIG. 1. The computing node 102 may be, for example, a server computer. The computing node 102 may include one or more physical computing components, such as processors.

The computing node 102 is configured to execute a hypervisor 110, a controller VM 108 and one or more user VMs, such as user VMs 104, 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any number may be implemented. User VMs may generally be provided to execute any number of applications which may be desired by a user.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 108 and/or controller VM 118, may provide services for the user VMs in the computing node. As an example of functionality that a controller VM may provide, the controller VM 108 may provide virtualization of the storage 140. Controller VMs may provide management of the distributed computing system shown in FIG. 1. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging PCI Passthrough in some examples. In this manner, controller VMs described herein may manage input/output (I/O) requests between VMs on a computing node and available storage, such as storage 140.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i). In some examples, the hypervisor 110 may be of a same type as the hypervisor 120.

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local memory 142. Services running on controller VM 118 may utilize memory in local memory 144. The local memory 142 and local memory 144 may be shared by VMs on computing node 102 and computing node 112, respectively, and the use of local memory 142 and/or local memory 144 may be controlled by hypervisor 110 and hypervisor 120, respectively. Moreover, multiple instances of the same service may be running throughout the distributed system—e.g. a same services stack may be operating on each controller VM. For example, an instance of a service may be running on controller VM 108 and a second instance of the service may be running on controller VM 118.

Generally, controller VMs described herein, such as controller VM 108 and controller VM 118 may be employed to control and manage any type of storage device, including all those shown in storage 140 of FIG. 1, including local storage 124 (e.g., SSD 126 and HDD 128), cloud storage 136, and networked storage 138. Controller VMs described herein may implement storage controller logic and may virtualize all storage hardware as one global resource pool (e.g., storage 140) that may provide reliability, availability, and performance. IP-based requests are generally used (e.g., by user VMs described herein) to send I/O requests to the controller VMs. For example, user VM 104 and user VM 106 may send storage requests to controller VM 108 using over a virtual bus. Controller VMs described herein, such as controller VM 108, may directly implement storage and I/O optimizations within the direct data access path. Communication between hypervisors and controller VMs described herein may occur using IP requests.

Note that controller VMs are provided as virtual machines utilizing hypervisors described herein—for example, the controller VM 108 is provided behind hypervisor 110. Since the controller VMs run "above" the hypervisors examples described herein may be implemented within any virtual machine architecture, since the controller VMs may be used in conjunction with generally any hypervisor from any virtualization vendor.

Virtual disks (vDisks) may be structured from the storage devices in storage 140, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 108 may expose one or more vDisks of the storage 140 and the hypervisor may attach the vDisks to one or more VMs, and the virtualized operating system may mount a vDisk on one or more user VMs, such as user VM 104 and/or user VM 106.

During operation, user VMs (e.g., user VM 104 and/or user VM 106) may provide storage input/output (I/O) requests to controller VMs (e.g., controller VM 108 and/or hypervisor 110). Accordingly, a user VM may provide an I/O request over a virtual bus to a hypervisor as an iSCSI and/or NFS request. Internet Small Computer system Interface (iSCSI) generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File system (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, examples of user VMs described herein may provide storage requests using an IP based protocol, such as SMB. The storage requests may designate the IP address for a controller VM from which the user VM desires I/O services. The storage request may be provided from the user VM to a virtual switch within a hypervisor to be routed to the correct destination. For examples, the user VM 104 may provide a storage request to hypervisor 110. The storage request may request I/O services from controller VM 108 and/or controller VM 118. If the request is to be intended to be handled by a controller VM in a same service node as the user VM (e.g., controller VM 108 in the same computing node as user VM 104) then the storage request may be internally routed within computing node 102 to the controller VM 108. In some examples, the storage request may be directed to a controller VM on another computing node. Accordingly, the hypervisor (e.g., hypervisor 110) may provide the storage request to a physical switch to be sent over a network (e.g., network 122) to another computing node running the requested controller VM (e.g., computing node 112 running controller VM 118).

Accordingly, hypervisors described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

The computing nodes shown in FIG. 1 and the storage 140 may form all or part of a computing cluster. Generally, a computing cluster refers to multiple computing nodes sharing a virtualized storage pool. A cluster may generally be managed (e.g., using the controller virtual machines) such that the computing cluster has some resiliency to the unavailability of one or more computing nodes and/or disks (e.g., with storage redundancy).

Certain virtual machines in a cluster, and/or in communication with a cluster described herein may be infrastructure dependent virtual machines. An infrastructure dependent virtual machine generally refers to a virtual machine that may utilize storage for operation and that one or more controller virtual machines (e.g., controller VM 108 and/or computing node 112) utilize to startup. In the computing cluster of FIG. 1, recall the controller virtual machines facilitate access to and from the storage 140. Accordingly, a conflict arises when an infrastructure dependent virtual machine is hosted by the cluster of FIG. 1 (e.g., configured to run on computing node 102 and/or computing node 112), and therefore may be in need of access to storage 140 for operation. However, access to storage 140 may be facilitated by the controller virtual machines in the cluster of FIG. 1. If the cluster goes down or restarts, the infrastructure dependent virtual machine may not be able to access storage 140 until the controller virtual machines startup, but the controller virtual machines may be unable to startup without access to the infrastructure dependent virtual machines. In some examples, infrastructure dependent virtual machines may be hosted by computer systems referred to as infrastructure dependent physical machines.

Examples of infrastructure dependent virtual machines include domain controllers. A domain controller may be a server or other computing system configured to run an active directory service, such as Active Directory by MICROSOFT. Active directory services generally store information regarding organizations, services, systems, and/or users. Active directory services may generally be responsible for authentication and authorization of users and/or computers in a domain. Active directory services may generally enforce security policies and/or ensure proper installation of software and deployment of services in a network. Accordingly, domain controllers may utilize storage (e.g., to store information, including information used to perform the active directory services).

In a secure network, the hosts, disks and/or other resources may start upon authentication from a domain controller running for the domain. An issue arises when all the domain controllers are running as a virtual machine on a cluster (e.g., as user VM 104, user VM 106, user VM 114, and/or user VM 116). In the event of a power failure or a restart, the cluster may fail to start up, and since the domain controllers are also down, they may fail to service authentication requests. On the other hand, the domain controllers may fail to start up because their data is present on the disks in the cluster (e.g., storage 140 of FIG. 1). This results in a chicken-egg scenario which can lead to a failure to start the cluster, since the start of cluster itself may depend on authentication by one or more domain controllers. This may cause downtime for the cluster and may result in downtime of other user virtual machines.

Another example of an infrastructure dependent virtual machine may be a domain name service (DNS) server. If all DNS servers servicing a cluster are running on the cluster, an analogous failure may occur where the DNS servers may be unable to startup without the cluster's storage, however the cluster's storage may remain unavailable until at least one DNS server is available.

Another example of an infrastructure dependent virtual machine may be a witness virtual machine that may be used in a two-node cluster. Operation of a witness VM may be a prerequisite for two-node cluster operation in some examples. The witness VM may be used in failure scenarios to coordinate rebuilding data and automatic upgrades. The witness VM may reside in a separate failure domain, which means that there may be independent power and network connections from each of the two-node clusters.

Infrastructure dependent virtual machines may be hosted on computing nodes in a cluster (e.g., each of user VM 104, user VM 106, user VM 114, and/or user VM 116 of FIG. 1 may be used to implement an infrastructure dependent virtual machine). Infrastructure dependent virtual machines may be located external to a cluster (e.g., running on one or more computing systems in communication with the cluster, but not utilizing storage 140 for operation of the infrastructure dependent virtual machine). In some clusters, some instances of infrastructure dependent virtual machines may be hosted by the cluster, and some instances of infrastructure dependent virtual machines may be external to the cluster.

Examples described herein may provide cluster check services, such as cluster check service 146, which may determine whether at least one infrastructure dependent virtual machine is located outside of the cluster (e.g., external to the cluster). In this manner, the storage utilized by at least one of the infrastructure dependent virtual machines may not be part of the cluster itself, which may reduce and/or avoid failure and/or downtime caused by unavailability of the service(s) provided by the infrastructure dependent virtual machine. Accordingly, locating an infrastructure dependent virtual machine external to a cluster generally refers to the storage being used by the external infrastructure dependent virtual machine not being included in the virtualized storage pool of the cluster.

There can be multiple instances of a particular infrastructure dependent virtual machine available for a cluster. For example, there may be multiple domain controllers and/or multiple DNS servers. Generally, examples of cluster check services may ensure that each computing node of a cluster has access to at least one of each particular type of infrastructure dependent virtual machine located external to the cluster. For example, a cluster check service may determine whether each computing node has access to at least one domain controller external to the cluster and at least one DNS server located external to the cluster.

The cluster check service 146 is shown in FIG. 1 as a service provided by controller VM 108. In some examples, multiple instances of cluster check services may be provided in a computing system, including one on each computing node in some examples. One instance of the cluster check service may serve as a leader instance in some examples. In some examples, the cluster check service may be provided as a user virtual machine and/or running on an administration computing system in communication with the cluster.

Examples of cluster check services may generate an alert if at least one of the plurality of infrastructure dependent virtual machines is not located externally to the computing cluster. The alert may be provided for each type of infrastructure dependent virtual machine in a system (e.g., one alert regarding domain controllers, another alert regarding DNS servers). The alert may be, for example, a visual, audible, and/or tactile stimulus provided by one or more of the computing nodes in the cluster, hosting the cluster check service and/or by an administrative computing system in communication with the cluster). The alert may prompt a user (e.g., a system administrator) to adjust a configuration of the cluster and infrastructure dependent virtual machines to ensure at least one of the infrastructure dependent virtual machines is located externally to the cluster. In some examples, the alert may prompt a user (e.g., a system administrator) to initiate a connection between a computing node of the cluster and an infrastructure dependent virtual machine external to the cluster.

In some examples, an alert may be displayed if all infrastructure dependant virtual machines reside on the cluster itself. Responsive to the alert, an administrator or other entity may migrate dependant VMs to a separate physical cluster or computer with to avoid a single point of failure.

Examples of cluster check services described herein may utilize IP addresses to determine whether infrastructure dependent virtual machines are located external to a cluster. During operation, the cluster check service 146 may query each of the nodes in a cluster (e.g. including the computing node 102 and computing node 112) to return IP addresses for each of the infrastructure dependent virtual machines in communication with the respective computing node. For example, the cluster check service 146 may query the computing node 102 by providing a query to the controller VM 108. The controller VM 108 may return IP addresses for all infrastructure dependent virtual machines in communication with the computing node 102. An analogous query may be made to computing node 112, and each additional computing node in the cluster (not shown in FIG. 1). In this manner, the cluster check service 146 may obtain IP addresses for each infrastructure dependent physical or virtual machine in communication with each of the computing nodes of a cluster.

For example, IP addresses of domain controllers and DNS servers of each computing node may be retrieved using PowerShell commands in some examples. For domain controllers, the command [system.DirectoryServices.ActiveDirectory.domain]::GetCurrentDomain( ) | % {$_.DomainControllers } may be used in some examples. For DNS servers, the command Get-DNSClientServerAddress may be used in some examples.

The cluster check service 146 may query an stored IP addresses, such as in address repository 148, to return IP addresses for each of the virtual machines running in the cluster (e.g., each of the user virtual machines). The address repository 148 may be stored in storage 140 and/or in local memory of one of the computing nodes, and/or in other storage accessible to the cluster. In some examples the address repository 148 may be generated by an administration system in communication with the cluster which may periodically fetch IP addresses of virtual machines running on cluster computing nodes. In some examples, the cluster check service 146 may access the address repository 148 using an application programming interface (API) for the address repository 148 and/or a service maintaining the address repository 148. In this manner, the cluster check service 146 may obtain the IP addresses of virtual machines in the computing cluster.

The cluster check service 146 may compare the IP addresses of the infrastructure dependent virtual machines and the IP addresses of virtual machines in the computing cluster to determine whether any infrastructure dependent virtual machines are present external to the cluster. In some examples, the cluster check service 146 may determine, for an entire cluster, whether any infrastructure dependent virtual machines are present external to the cluster. For example, an alert may be raised if all domain controllers and/or all DNS servers are running on the cluster. In some examples, the cluster check service 146 may determine, for each computing node of a cluster, whether the computing node has access to at least one infrastructure dependent virtual machine external to the cluster. An alert may be raised as to any computing node when the computing node is not able to communicate with at least one infrastructure dependent virtual machine located external to the cluster (e.g., at least one domain controller external to the cluster and/or at least one DNS server external to the cluster).

Figure 2A:
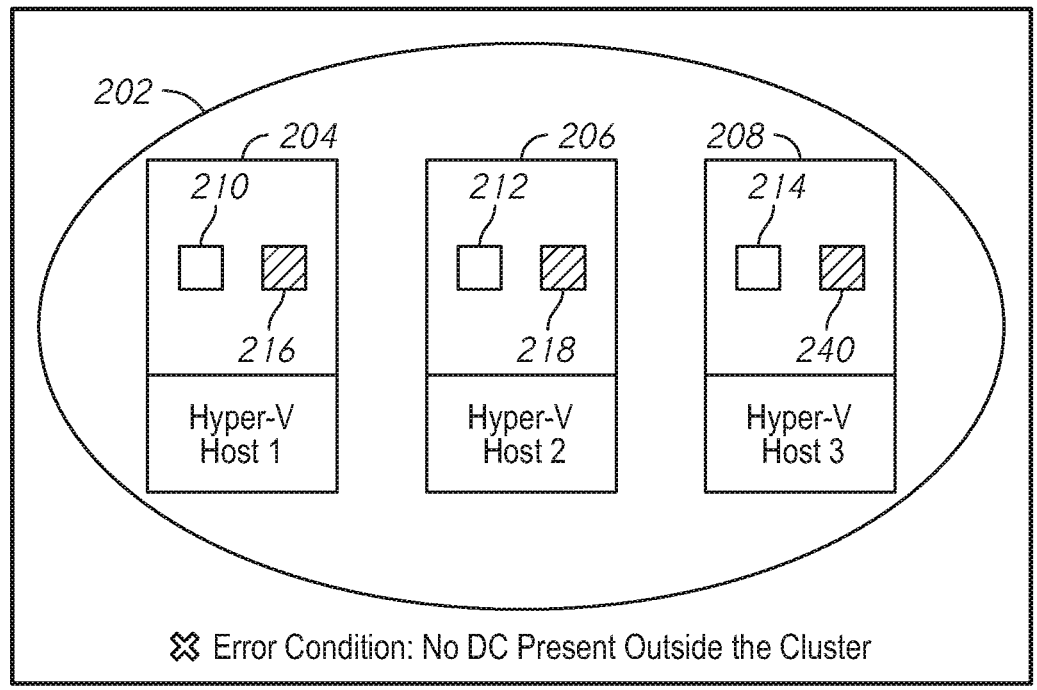
FIG. 2A and FIG. 2B are schematic illustrations of clusters arranged in accordance with examples described herein.
Figure 2B:
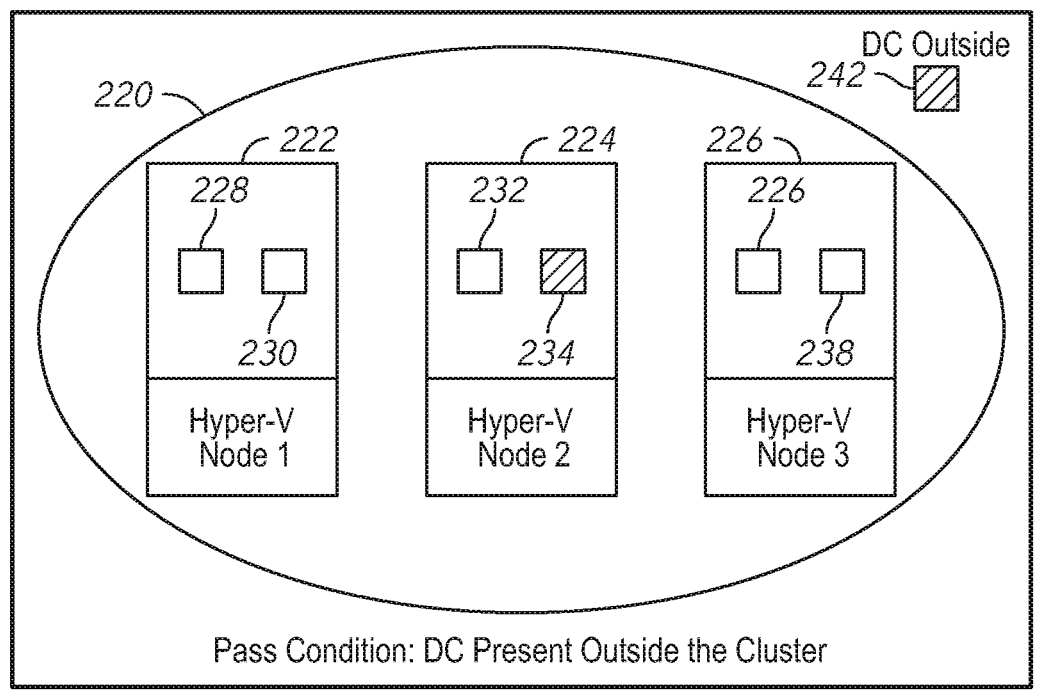

FIG. 2A and FIG. 2B are schematic illustrations of clusters arranged in accordance with examples described herein. FIG. 2A shows cluster 202. The cluster 202 includes three nodes—node 204, node 206, node 208. Each node may be executing a hypervisor and may share a virtualized storage pool as described herein. For example, the system shown in FIG. 1 may be used to implement the cluster 202 in some examples. The node 204 is running user VM 210 and domain controller 216. The node 206 is running user VM 212 and domain controller 218. The node 208 is running user VM 214 and user VM 240.

Accordingly, when a cluster check service queries each of the nodes for IP addresses of domain controllers, it may receive the IP addresses of domain controller 216 and domain controller 218. When a cluster check service accesses an address repository for IP addresses of virtual machines running in the cluster, it may obtain the IP addresses of user VM 210, domain controller 216, user VM 212, domain controller 218, user VM 214, and user VM 240. All IP addresses of domain controllers (e.g., domain controller 216 and domain controller 218) would also be reflected in the list of IP addresses of virtual machines running in the cluster. Accordingly, a cluster check service may determine that there are no domain controllers external to cluster 202, and may provide an alert.

FIG. 2B shows cluster 220. The cluster 220 includes three nodes—node 222, node 224, node 226. Each node may be executing a hypervisor and may share a virtualized storage pool as described herein. For example, the system shown in FIG. 1 may be used to implement the cluster 220 in some examples. The node 222 is running user VM 228 and user VM 230. The node 224 is running user VM 232 and domain controller 234. The node 226 is running user VM 236 and user VM 238. An additional domain controller, domain controller 242, is present external to the cluster 220, but in communication with the cluster 220

Accordingly, when a cluster check service queries each of the nodes for IP addresses of domain controllers, it may receive the IP addresses of domain controller 234 and domain controller 242. When a cluster check service accesses an address repository for IP addresses of virtual machines running in the cluster, it may obtain the IP addresses of user VM 228, user VM 230, user VM 232, domain controller 234, user VM 236, and user VM 238. Accordingly, one IP address of a domain controllers (e.g., domain controller 242) would not be reflected in the list of IP addresses of virtual machines running in the cluster. Accordingly, a cluster check service may determine that there is at least one domain controller external to cluster 220, and may not provide an alert.

Figure 3:
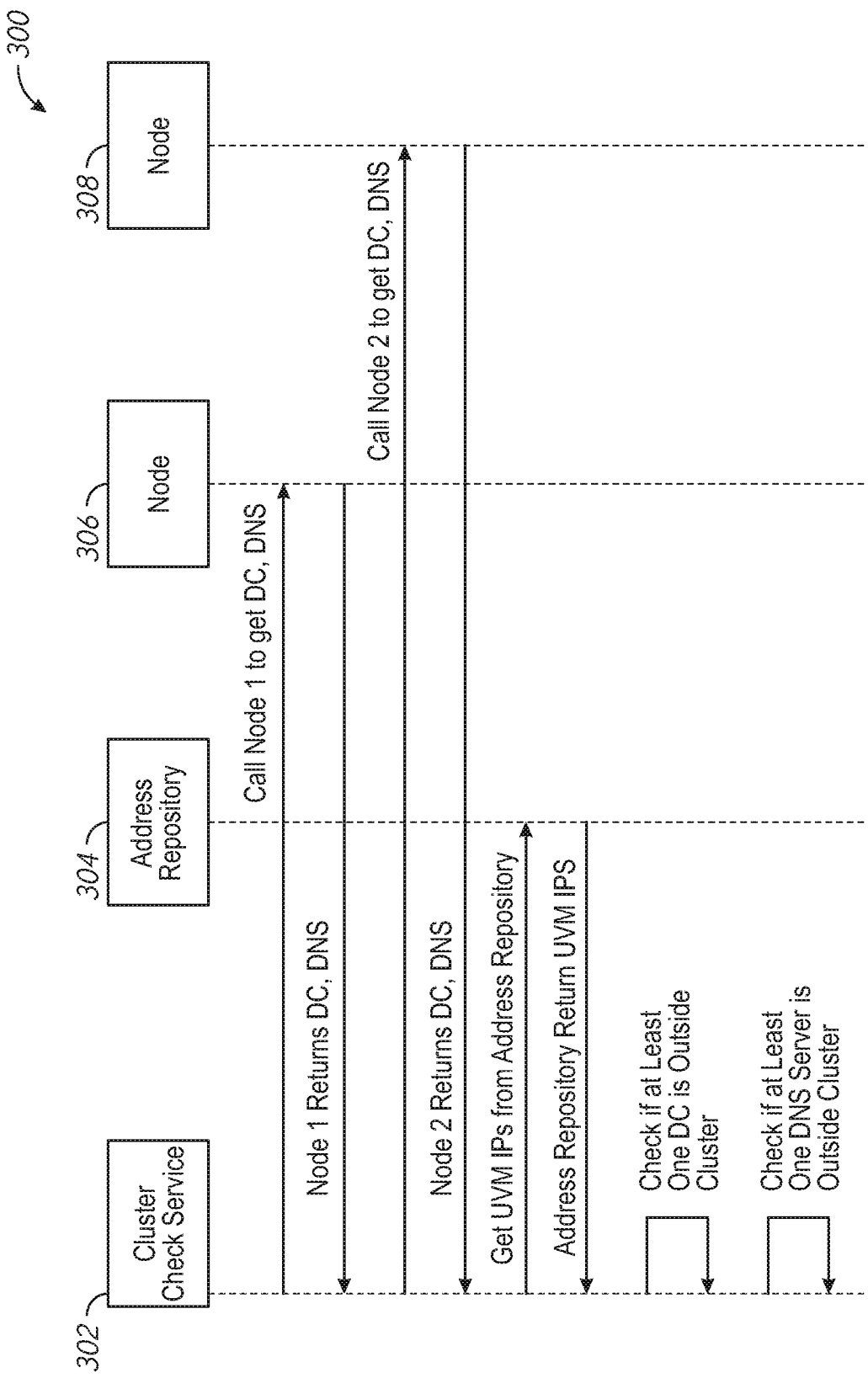
FIG. 3 is a sequence diagram illustrating operation of a cluster check service arranged in accordance with examples described herein.

FIG. 3 is a sequence diagram illustrating operation of a cluster check service arranged in accordance with examples described herein. FIG. 3 illustrates an example sequence of operations which may be performed by various portions of a system described herein. For example, the operations of FIG. 3 may be performed using cluster check service 302, address repository 304, node 306, and/or node 308. The cluster check service 302 may be implemented using a cluster check service 146 of FIG. 1 in some examples. The address repository 304 may be implemented using the address repository 148 of FIG. 1 in some examples. The node 306 and node 308 may be implemented using the computing node 102 and computing node 112 of FIG. 1, respectively, in some examples.

Operation of the cluster check service may be initiated at any time during operation of a cluster, including at startup, periodically during operation of the cluster, or a predefined and/or random times during operation of the cluster.

During operation, as shown in FIG. 3, the cluster check service 302 may query (e.g., call) node 306 to obtain IP addresses of infrastructure dependent virtual machines in communication with the node 306 (e.g., domain controllers and/or DNS servers). The node 306 may return the requested IP addresses. The cluster check service 302 may query node 308 to obtain IP addresses of infrastructure dependent virtual machines in communication with the node 308. The node 308 may return the requested IP addresses. The queries of node 306 and node 308 may occur sequentially or wholly or partially in parallel in some examples. While queries of two nodes is shown in FIG. 3, any number of nodes may be in a cluster and may be queried.

The cluster check service 302 may obtain IP addresses of virtual machines in the cluster (e.g., user virtual machines) by accessing address repository 304. The address repository 304 may provide access to the requested IP addresses. The cluster check service 302 may access the address repository 304 before, after, or wholly or partially during the queries of one or more nodes.

The cluster check service 302 may then compare the IP addresses of the infrastructure dependent virtual machines with the IP addresses of the virtual machines in the cluster to determine whether at least one infrastructure dependent virtual machine is provided external to the cluster. As shown in FIG. 3, the comparison may occur multiple times for multiple different types of infrastructure dependent virtual machines. For example, the cluster check service 302 may check if at least one domain controller is external to the cluster. The cluster check service 302 may independently check if at least one DNS server is external to the cluster.

Based on the IP address comparisons (e.g., checks), cluster check services described herein may take a variety of actions. In some examples, an alert is provided indicating that there are no infrastructure dependent virtual machines external to the cluster. The alert may be presented to a user (e.g., a system administrator) or another service or process in the system. In some examples, the cluster check service 302 may generate an alert when at least one of the queries nodes is unable to communicate with an infrastructure dependent virtual machine outside of the cluster (e.g., the only infrastructure depending virtual machines in the system are hosted in the cluster).

In some examples, the cluster check service 302 may provide an infrastructure dependent virtual machine external to the cluster when the comparison indicates that one is not yet present in the system. For example, the cluster check service 302 may initiate installation of a domain controller and/or DNS server at a location external to the cluster when comparisons performed by the cluster check service 302 indicate no external domain controller and/or DNS server was provided. In some examples, the cluster check service 302 may initiate a connection between a node which did not return the IP address of an external infrastructure dependent virtual machine and an external infrastructure dependent virtual machine.

Figure 4:
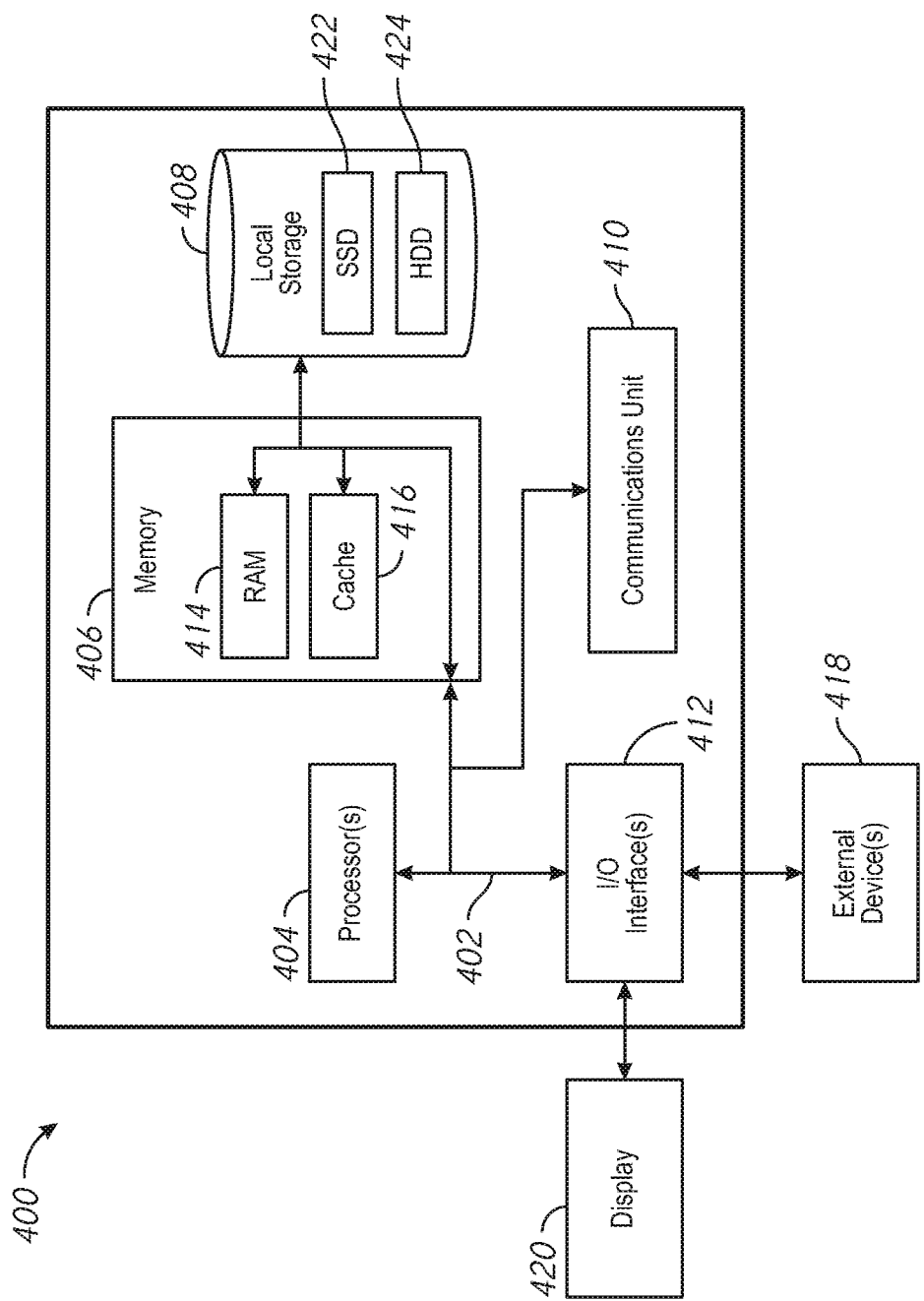
FIG. 4 depicts a block diagram of components of a computing node 400 in accordance with examples described herein.

FIG. 4 depicts a block diagram of components of a computing node 400 in accordance with an embodiment of the present invention. It should be appreciated that FIG. 4 provides only an illustration of one implementation and does not imply any limitations with regard to the environments in which different embodiments may be implemented. Many modifications to the depicted environment may be made. The computing node 400 may implemented as the computing node 102 and/or computing node 112.

The computing node 400 includes a communications fabric 402, which provides communications between one or more processor(s) 404, memory 406, local storage 408, communications unit 410, I/O interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses.

The memory 406 and the local storage 408 are computer-readable storage media. In this embodiment, the memory 406 includes random access memory RAM 414 and cache 416. In general, the memory 406 can include any suitable volatile or non-volatile computer-readable storage media. The local storage 408 may be implemented as described above with respect to local storage 124 and/or local storage 130. In this embodiment, the local storage 408 includes an SSD 422 and an HDD 424, which may be implemented as described above with respect to SSD 126, SSD 132 and HDD 128, HDD 134 respectively.

Various computer instructions, programs, files, images, etc. may be stored in local storage 408 for execution by one or more of the respective processor(s) 404 via one or more memories of memory 406. In some examples, local storage 408 includes a magnetic HDD 424. Alternatively, or in addition to a magnetic hard disk drive, local storage 408 can include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computing node 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention can be stored on such portable computer-readable storage media and can be loaded onto local storage 408 via I/O interface(s) 412. I/O interface(s) 412 also connect to a display 420.

Display 420 provides a mechanism to display data to a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
   receiving, responsive to a query of a first node of a computing cluster, IP addresses for infrastructure dependent virtual machines in communication with the first node;
   identifying an IP address for each user virtual machine in the computing cluster;
   comparing the IP addresses for the infrastructure dependent virtual machines in communication with the first node and the IP address for each user virtual machine in the computing cluster; and
   generating an alert when said comparing indicates that each of the infrastructure dependent virtual machines are located within the computing cluster, such that the first node is unable to communicate with an infrastructure dependent virtual machine outside of the computing cluster.

2. The method of claim 1, wherein the computing cluster comprises a plurality of nodes and a storage pool, wherein each node of the plurality of nodes is configured to host a hypervisor, a plurality of user virtual machines, and a controller virtual machine.

3. The method of claim 2, wherein the controller virtual machine manages input/output requests between the plurality of user virtual machines and the storage pool.

4. The method of claim 1, further comprising initiating an infrastructure dependent virtual machine outside of the computing cluster responsive to the alert.

5. The method of claim 1, further comprising initiating, responsive to the generated alert, a connection between the first node and a selected infrastructure dependent virtual machine outside of the computing cluster.

6. The method of claim 1, wherein the infrastructure dependent virtual machines comprise a directory service configured to authenticate users and nodes in a domain.

7. The method of claim 1, wherein the infrastructure dependent virtual machines comprise domain controllers or domain name system servers (DNS servers).

8. At least one non-transitory computer-readable storage medium including instructions that when executed by a computing node in a distributed computing system, cause the computing node to:
   query a first node of a computing cluster to return IP addresses for infrastructure dependent virtual machines in communication with the first node;
   receive the IP addresses for infrastructure dependent virtual machines in communication with the first node;
   identify the IP address for each user virtual machine in the computing cluster;
   compare the IP addresses for infrastructure dependent virtual machines in communication with the first node and the IP address for each user virtual machine in the computing cluster; and
   generate an alert when said comparing indicates that each of the infrastructure dependent virtual machines are located within the computing cluster, such that the first node is unable to communicate with an infrastructure dependent virtual machine outside of the computing cluster.

9. The at least one computer-readable storage medium of claim 8, wherein the computing cluster comprises a plurality anodes and a storage pool, wherein each node of the plurality anodes is configured to host a hypervisor, a plurality of user virtual machines, a controller virtual machine.

10. The at least one computer-readable storage medium of claim 9, wherein the controller virtual machine manages input/output requests between the plurality of user virtual machines and the storage pool.

11. The at least one computer-readable storage medium of claim 8, wherein the instructions further cause the computing node to initiate an infrastructure dependent virtual machine outside of the cluster responsive to the alert.

12. The at least one computer-readable storage medium of claim 8, wherein the instructions further cause the computing node to initiate a connection between the first node and a selected infrastructure dependent virtual machine outside of the computing cluster.

13. The at least one computer-readable storage medium of claim 8, wherein the infrastructure dependent virtual machines each comprise a directory service configured to authenticate users and nodes in a domain.

14. The at least one computer-readable storage medium of claim 8, wherein the infrastructure dependent virtual machines comprise domain controllers or domain name system servers (DNS servers).

15. A system comprising:
a computing cluster comprising:
a storage pool; and
a plurality of nodes, the storage pool virtualized for access by the plurality of nodes, the plurality of nodes each configured to host a hypervisor, a plurality of user virtual machines, and a controller virtual machine, the controller virtual machine configured to manage input/output requests between the plurality of user virtual machines and the storage pool;
a plurality of infrastructure dependent virtual machines, wherein the plurality of infrastructure dependent virtual machines are configured to utilize storage for operation, and
wherein the controller virtual machine is configured to utilize at least one of the plurality of infrastructure dependent virtual machines to startup the cluster: and
a cluster check service, the cluster check service configured to determine whether at least one of the plurality of infrastructure dependent virtual machines are located externally to the computing cluster.

16. The system of claim 15, wherein the cluster check service is configured to generate an alert if at least one of the plurality of infrastructure dependent virtual machines is not located externally to the computing cluster.

17. The system of claim 15, wherein at least one of the plurality of infrastructure dependent virtual machines is hosted by at least one of the plurality of nodes.

18. The system of claim 15, wherein the cluster check service is hosted by at least one of the plurality of nodes.

19. The system of claim 15, wherein the cluster check service is configured to:
query each of the plurality of nodes to return IP addresses for each infrastructure dependent physical or virtual machine in communication with a respective node of the plurality of nodes.

20. The system of claim 19, wherein the cluster check service is further configured to: query an address server to return IP addresses for each virtual machine configured to run in the computing cluster; and
compare the IP addresses for each of the user virtual machines and the IP addresses for each of the infrastructure dependent virtual machines to determine whether at least one of the plurality of infrastructure dependent virtual machines are located externally to the computing cluster.

21. The system of claim 15, wherein the plurality of infrastructure dependent virtual machines comprise domain controllers or domain name system servers (DNS servers).

* * * * *